(12) United States Patent
Chang

(10) Patent No.: US 6,388,878 B1
(45) Date of Patent: May 14, 2002

(54) MEASURING DEVICE IN A MOBILE RACK FOR HARD DISK

(76) Inventor: Cheng-Chun Chang, 11F-2, No. 11, Lane 202, Jing-Sing Road Wen-Shan DT, Taipei (TW)

( * ) Notice: Subject to any disclaimer, the term of this patent is extended or adjusted under 35 U.S.C. 154(b) by 131 days.

(21) Appl. No.: 09/637,915

(22) Filed: Aug. 14, 2000

(51) Int. Cl.[7] .............................. G06F 1/20; H05K 7/20
(52) U.S. Cl. ...................... 361/687; 361/685; 361/727; 700/275; 702/132
(58) Field of Search ........................ 361/685, 724–727, 361/695, 694, 687; 439/928.1; 700/275, 276, 278, 299; 702/130, 132

(56) References Cited

U.S. PATENT DOCUMENTS

| | | | |
|---|---|---|---|
| 4,964,018 A | * 10/1990 | Mallory et al. | 361/681 |
| 5,694,290 A | * 12/1997 | Chang | 361/685 |
| 5,822,184 A | * 10/1998 | Rabinovitz | 361/685 |
| 6,134,667 A | * 10/2000 | Suzuki et al. | 713/300 |
| 6,144,549 A | * 11/2000 | Moss et al. | 361/681 |
| 6,185,481 B1 | * 2/2001 | Kondou et al. | 700/275 |
| 6,188,571 B1 | * 2/2001 | Roganti et al. | 361/685 |
| 6,331,933 B1 | * 12/2001 | Rumney | 361/679 |

* cited by examiner

Primary Examiner—Lynn D. Feild
(74) Attorney, Agent, or Firm—Troxell Law Office PLLC

(57) ABSTRACT

A measuring device in a mobile rack for hard disk is fixed to a window opening at the front side of the inner rack in the mobile rack and comprises a circuit board and a controller on the circuit board. The circuit board and the controller connect and control an input end, one or more output ends, at least one temperature sensor rod, and a display respectively. Therefore, the temperature of the hard disk in the mobile rack can be measured, a default temperature can be reset, and the speed of the respective fan can be measured. Moreover, once the fans is abnormally running and the temperature in the hard disk is higher than the default value, a buzzer may send out a warning sound respectively.

10 Claims, 3 Drawing Sheets

MEASURING DEVICE IN A MOBILE RACK FOR HARD DISK

BACKGROUND OF THE INVENTION

1. Field of the Invention

The present invention relates to a test device in a mobile rack for hard disk, and particularly to test device, which is disposed in the mobile rack and is capable for measuring the temperature of a hard disk, resetting a default value of temperature, and measuring the speed of fan.

2. Description of Related Art

A mobile rack for hard disk offers the user to pull out a hard disk from the main frame of a personal computer easily while the hard disk is going to be replaced. But, it is know that when a hard disk mounted in the main frame of the personal computer is going to be replaced, it is required to detach the outer casing thereof beforehand. The handiness makes the mobile rack be one of typical periphery parts. Furthermore, the hard disk in the mobile rack is often used for storage of backup data such that the mobile rack with hard disk is as important as a hard disk mounted in the casing. Because the operation system and the application software having been developed to require a hard disk of larger storage space, a greater capacity of hard disk has to be made to meet the requirement accordingly. Therefore, large capacities such as 13 GB and 20 GB have been made available already. Meanwhile, in order to read data much more swiftly, the hard disk is made to run a higher speed such as 7,200 rpm or more. It can be understood that a pretty high temperature may generate under a high rotation speed. System engineers of computer are aware of that the stability of CPU is hard to control while the CPU runs under the circumstance of high temperature. Similarly, the hard disk may be out of order or the tracks o n the hard disk may be damaged while data is read or store d under the circumstance of high temperature.

In order to discharge the heat generated in the conventional mobile rack, a fan is provided at the base thereof and the inner rack at the front part thereof is provided with one or two fans. Once the fans are running, the air therein becomes in a state of convection such that the heat therein may be dissipated. Once the fans are out of order or abnormal in rotation speed, it is not possible for the air therein is in a state of the convection. Thus, the heat in the inner rack can not be discharged and the temperature therein maintains high so as to affect the data read and data storage.

SUMMARY OF THE INVENTION

An object of the present invention is to provide a measuring device in a mobile rack for hard disk, with which the respective speed of fans therein may be measured such that the user is able to keep aware of the fans being normally running or not.

Another object of the present invention is to provide a measuring device in a mobile rack for hard disk, with which the temperature in the hard disk may be measured and a warning sound may be sent out to remind the user.

BRIEF DESCRIPTION OF THE DRAWINGS

The present invention can be more fully understood by referring to the following description and accompanying drawing, in which.

DETAILED DESCRIPTION OF THE PREFERRED EMBODIMENTS

Figure 1:
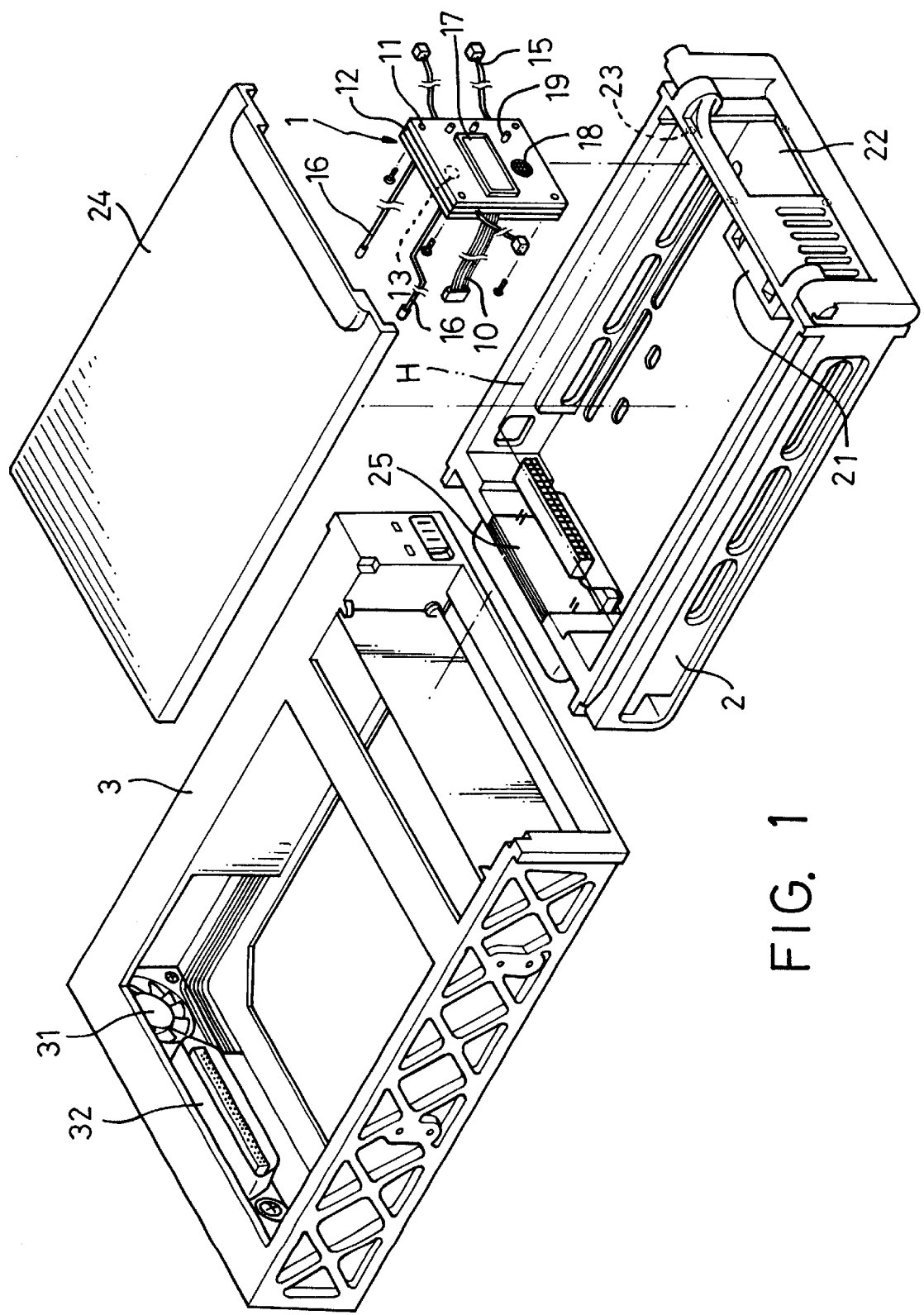
FIG. 1 is a perspective exploded view of a mobile rack with measuring device in accordance with the present invention.
Figure 2:
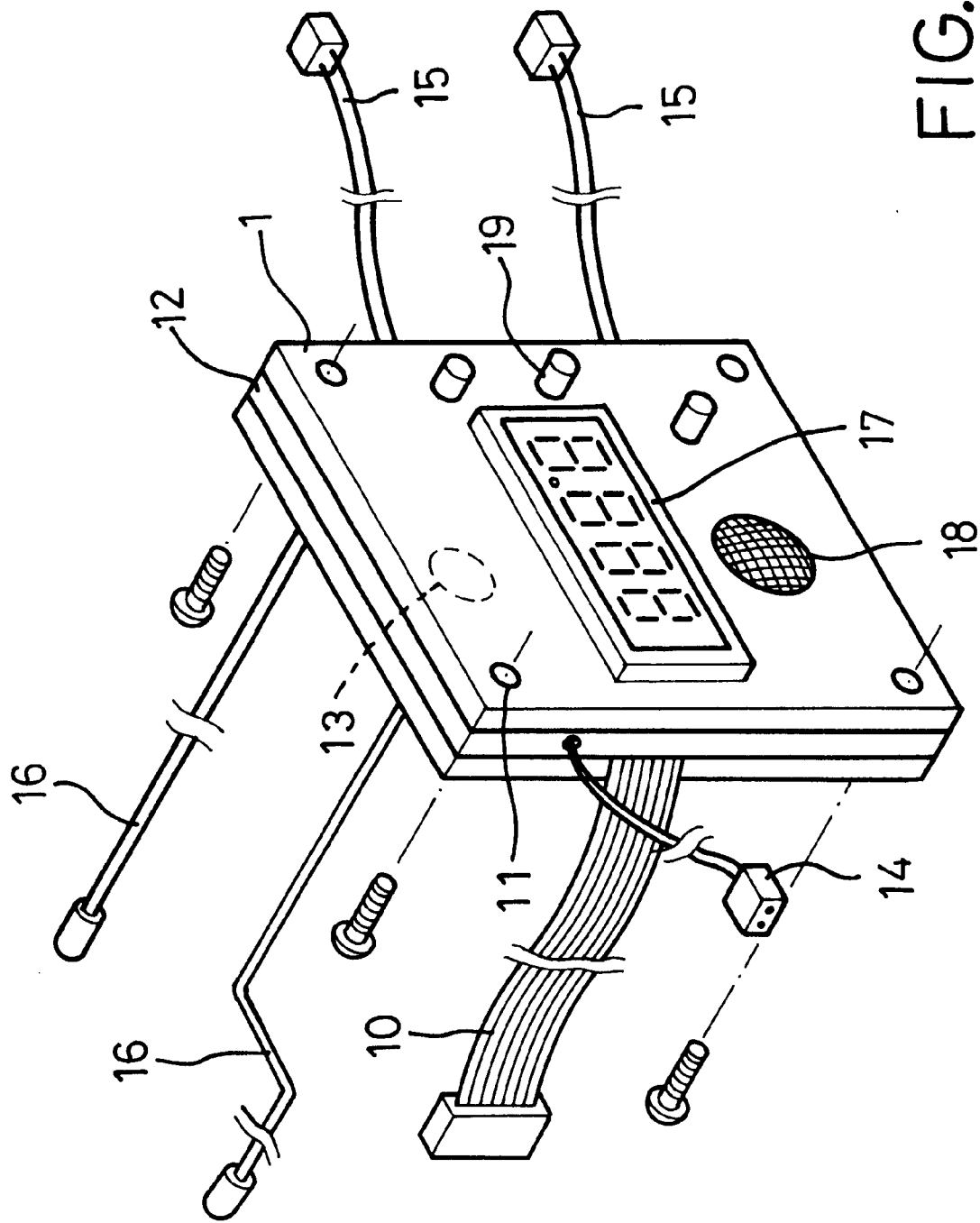
FIG. 2 is a perspective view of the measuring device shown in FIG. 1.
Figure 3:
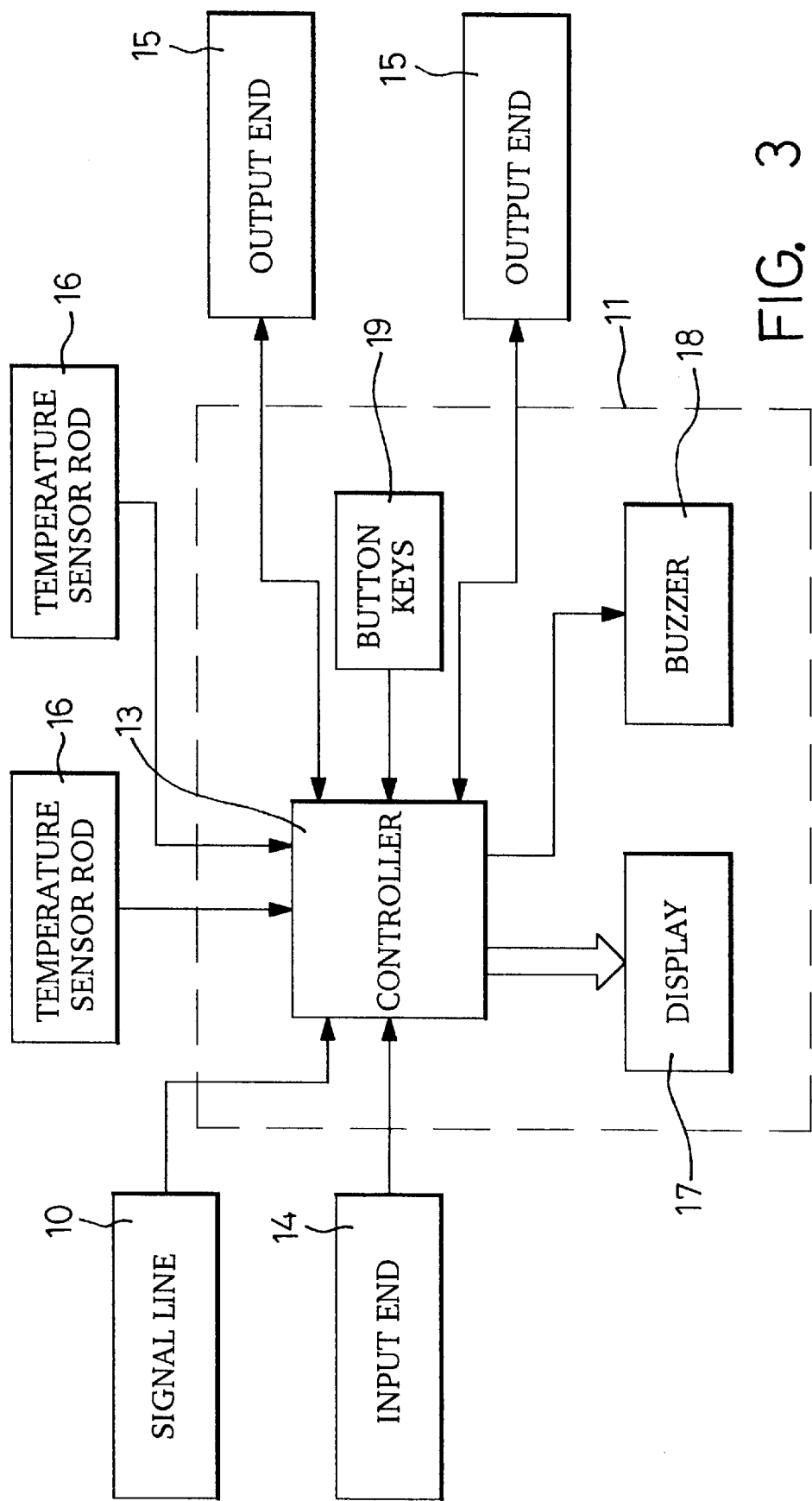
FIG. 3 is a block diagram of a circuit board in the measuring device of the present invention.

Referring to FIG. 1, the measuring device 1 of the present invention is disposed at the front side of the inner rack 2 in the conventional mobile rack and the inner rack 2 is movably received in the stationary rack 3. The stationary rack 3 is fixed to the casing of a computer and optionally provided with a fan 31. As shown in FIG. 1, the fan 31 is disposed at the rear side of the stationary rack 3, but it only for taking an example and not for a restriction. A hard disk H (dash lines shown in FIG. 1) may be detachably fixed in the inner rack 2 and a fan 21 is also mounted on the inner rack 2 at the front side thereof. A window opening 22 is provided on the front side of the inner rack 2 with a plurality of engaging holes 23 for receiving and locating the measuring device 1. Besides, an upper cover 24 is provided at the top of the inner rack 2 to protect the hard disk "H" in the inner rack 2.

The measuring device 1 has the same size as the fan 21 feasible for fixing to the inner rack 2. The measuring device 1 is provided with through holes 11 corresponding, to the engaging holes 23 such that screws can pass through the holes 11 and fasten to the engaging holes 23. Alternatively, the engaging holes 11 extend locating posts to engage with the through holes 11 such that the measuring device 2 can be fixed to inward side of the window opening 22. The measuring device 1 comprises a circuit board 12 and there is a controller 13, which used in the conventional induced/ sensing circuit, on the circuit board 12. The controller 13 connects and controls an input end 14, one or more output ends 15, at least one temperature sensor rod 16, a display 17, a buzzer 18, and one or more button keys 19. Besides, the controller 13 is provided with a timer circuit for displaying time.

The input end 14 connects with a connector 25 in the inner rack 2 such that the external power source can be taken and supplying to the measuring device.

The output ends 15 are optionally connected to the fan 21 in the inner rack 2 and/or to the fan 31 on the stationery rack 3. The speeds of the fans 21, 31 are fed back to the controller 13 by way of the output ends 15 to sense the rotation frequencies of fans 21, 31. In addition, the display 17 keeps monitoring the connections of the output ends with the fans 21, 31. If the fans have an abnormal run or are out of order, the buzzer 18 may make warning sound to remind the user a repair has to be done.

The temperature sensor rod 16 at an end thereof is associated with the circuit board 12, and the other end of the temperature sensor rod 16 extends laterally to the hard disk "H". In case of the hard disk being in a state running, the temperature sensor rod 16 may transmit the actual temperature of the hard disk "H" to the controller 13 so as to be read by the induced circuit in the circuit board. Thus, the display 17 may show the temperature in Centigrade (°C) or Fahrenheit (°F) such that the temperature of the hard disk during in a state of run can be observed entirely. Furthermore, a default value of temperature can set by way of button keys 19 and the controller 13, for instance, the default value is set 50° and memorized in the controller 13. When the temperature of 50° is reached in the hard disk, the controller 13 allows the buzzer 18 making buzzing sound to notify the user.

The display 17 receives an instruction of the controller 13 to appear the status of fans respectively, the temperature of hard disk, temperature reset, and the time.

The buzzer 18 receives an instruction of the controller 13 either and may be mounted on the circuit board 12 or may be disposed outside the circuit board 12 with wiring connection to each other. Once the fans have an abnormal run or are out of order, a buzzing sound is made by the buzzer 18 to give the user a warn. In the meantime, the buzzing sound may be made by the buzzer 18 too in case of the temperature in hard disk "H" being higher than the default value set by the user. Furthermore, the buzzing sound for the abnormal fan is different from that for temperature of hard disk such that the user is able to differentiate between these two states.

The button keys 19 is used for reset or input and joins the controller 13 such that the default value of temperature and time setting can be reset and adjusted as desired.

Furthermore, said circuit board 12 of measuring device 1 further extent a signal line 10 which connects to the preset ID address of the SCSI hard disk of inner rack 2. When the inner rack 2 is inserted into the stationary rack 3, the preset ID address e.g. ID 4 can be immediately displayed on the display 17, whereby to read the real ID code of hard disk position in the SCSI array, to avoid the wrong insertion of hard disk.

Referring FIG. 1 again, the measuring device 1 is mounted on the window opening 22 at the front side of the inner rack 2. The input end 14 engages with the connector 25 at the rear side of the inner rack 2. The one of output ends 15 connects with the fan 21 and the other output end 15 inserts to the connector 25. Hence, the connector 25 engaging with the connector 32 makes the fan 31 is electrically connected at the time of the inner rack 2 fitting with the stationary rack 3. While the mobile rack of the present invention is inserted into the computer frame, the hard disk in the inner rack 2 may run in accordance with the data read or storage. Under this circumstance, the temperature in the hard disk may be transmitted to the controller 13 by way the temperature sensor rod 16 and appears on the display in a digital form. While a default value is reached, the controller allows the buzzer 18 sending out warning sound such that the user can watch the display 17 that if the indicating marks of the fans 21, 31 are there or not. If one or both of the indicating marks does/do not appear on the display 17, it means one or both of the fans is/are out of order. Thus, the fan or fans can be repair or replace a new one to assure the durability of the hard disk.

If one of the fans is or both of the fans are abnormally run or out of order, the buzzer may make warning sound as well in case of the controller having sensed abnormal speed frequency. Then, the user can proceed to repair the fans or replace a new one as mentioned above.

In use, the measuring device has the same size as the fan and the through holes thereon have the same locations as the preset location of holes on the fan such that it is fast to mount on the inner rack at the front side thereof. In addition, the temperature sensor rod makes the temperature of the hard disk during in running can keep appearing on the display all the time. A default value of temperature makes the buzzer be instructed by the controller to send out warning sound while the hard disk has a temperature reaching the default value. Furthermore, the controller keep sensing the speed of the fan and the buzzer may make warning sound while occurs an abnormal speed of fan. It is appreciated that the present invention keeps sensing the temperature of the hard disk and an abnormal heat dissipation to assure a longer life span of hard disk.

While the invention has been described with reference to the preferred embodiments thereof, it is to be understood that modifications or variations may be easily made without departing from the spirit of this invention, which is defined by the appended claims.

What is claimed is:

1. A mobile rack with measuring device for hard disk, comprising
    an inner rack attached with a fan, having a window opening at a front side thereof for fixing the measuring device, being provided with a connector, and receiving the hard disk; and
    a stationary rack with or without fans, movably receiving the inner rack;
    wherein, the measuring device further comprising a circuit board and a controller on the circuit board;
    characterized in that the circuit board and the controller join and control the following components:
        an input end, connecting with the connector on the inner rack for taking power source externally;
        one or more output ends, connecting with the fan in the inner rack and/or the fan on the stationary rack, and feeding the respective speed of the fans back to the controller for sensing the rotation frequency;
        at least one temperature sensor rod, extending from the circuit board to the hard disk in the inner rack for keeping in a state of sensing the temperature in the hard disk so as to be read by the controller;
        a display, being disposed at the window opening, receiving instructs of the controller, and appearing updating state of the respective fan and the temperature of the hard disk.

2. The mobile rack with measuring device for hard disk as defined in claim 1, wherein the measuring device provides one or more through holes to be passed through by screws fastening to engage holes at an inner wall of front side on the inner rack for fixing the measuring device.

3. The mobile rack with measuring device for hard disk as defined in claim 1, wherein the output ends have two pieces for connecting the fan in the inner rack and the fan on the stationary rack.

4. The mobile rack with measuring device for hard disk as defined in claim 1, wherein a timer circuit is set in the controller for appearing time on the display.

5. The mobile rack with measuring device for hard disk as defined in claim 1, wherein one or more button keys is/are provided on the circuit to connect with the controller for resetting the default value of temperature.

6. The mobile rack with measuring device for hard disk as defined in claim 4, wherein one or more button keys is/are provided on the circuit to connect with the controller for resetting and adjusting the displayed time.

7. The mobile rack with measuring device for hard disk as defined in claim 1, wherein a buzzer is provided in the circuit board or externally connects with the circuit board to receive instructions of the controller such that a warning sound is sent out in case of the fans running abnormally or the temperature of hard disk being higher than the default value.

8. The mobile rack with measuring device for hard disk as defined in claim 7, wherein the warning sound for abnormal running of the respective fan is different from that for abnormal temperature of hard disk so as to be differentiated between these two warning sounds.

9. The mobile rack with measuring device for hard disk as defined in claim 1, wherein measuring device further. extent a signal line which connects to the preset ID address of the SCSI hard disk, whereby displays the ID code of hard disk on the display.

10. The mobile rack with measuring device for hard disk as defined in claim 1, wherein temperature sensor rods are plurally installed in different positions.

* * * * *